(12) United States Patent
Hsieh

(10) Patent No.: US 10,701,910 B2
(45) Date of Patent: Jul. 7, 2020

(54) STRUCTURE OF AQUARIUM FILTER

(71) Applicant: Chin-San Hsieh, Tainan (TW)

(72) Inventor: Chin-San Hsieh, Tainan (TW)

(*) Notice: Subject to any disclaimer, the term of this patent is extended or adjusted under 35 U.S.C. 154(b) by 79 days.

(21) Appl. No.: 16/035,726

(22) Filed: Jul. 16, 2018

(65) Prior Publication Data

US 2018/0317464 A1 Nov. 8, 2018

(51) Int. Cl.
*A01K 63/04* (2006.01)
*C02F 1/28* (2006.01)
*C02F 1/00* (2006.01)

(52) U.S. Cl.
CPC .......... *A01K 63/045* (2013.01); *C02F 1/283* (2013.01); *C02F 1/001* (2013.01)

(58) Field of Classification Search
USPC .... 47/62 R; 210/167.25, 167.21, 500.1, 507, 210/510.1; 119/200, 245, 259
See application file for complete search history.

(56) References Cited

U.S. PATENT DOCUMENTS

| | | | | |
|---|---|---|---|---|
| 4,863,594 | A * | 9/1989 | Pedretti | A01K 63/045 210/167.22 |
| 5,053,125 | A * | 10/1991 | Willinger | A01K 63/045 119/260 |
| 7,425,274 | B1 * | 9/2008 | Helfet | A01K 63/045 210/151 |
| 2003/0085167 | A1 * | 5/2003 | Fox | A01K 63/045 210/167.25 |
| 2008/0210612 | A1 * | 9/2008 | Willinger | A01K 63/045 210/167.27 |
| 2011/0120005 | A1 * | 5/2011 | King | A01G 31/02 47/62 N |
| 2013/0220932 | A1 * | 8/2013 | Marioni | A01K 63/04 210/663 |
| 2014/0096718 | A1 * | 4/2014 | Allen | A01K 63/047 119/259 |
| 2014/0223819 | A1 * | 8/2014 | Coghlan | A01K 63/045 47/62 R |
| 2017/0202189 | A1 * | 7/2017 | Chun | A01K 63/045 |

FOREIGN PATENT DOCUMENTS

| | | | | |
|---|---|---|---|---|
| JP | 2732652 | * | 3/1998 | B01D 39/14 |
| JP | 2004358376 | * | 12/2004 | A01K 63/04 |
| JP | 3140125 | * | 2/2008 | A01K 63/04 |

OTHER PUBLICATIONS

Machine translation IP.com "JP 3140125" published Mar. 12, 2008 (Year: 2008).*

* cited by examiner

*Primary Examiner* — Nina Bhat

(57) ABSTRACT

An improved structure of the aquarium filter includes a filter cloth made of nonwoven fabric with small pores and high density that is installed on the outermost layer of the filter, an activated carbon filter sheet that wraps within the filter cloth and can deodorize smell and filter impurities, and a filter net made of resin foam with large pores and low density that wraps within the activated carbon filter sheet. The filter is made of filter materials in multiple layers that are formed individually by one single process so that the production cost can be reduced. Furthermore, a support frame is installed on the aquarium. A support platform is set on the support frame on which the planting unit sits. The filter is placed on the uppermost support platform. Nutrients generated from the decomposition of fish excreta in the water are absorbed by plants.

1 Claim, 5 Drawing Sheets

STRUCTURE OF AQUARIUM FILTER

BACKGROUND OF THE INVENTION

1. Field of the Invention

The invention relates to an aquarium filter and more particularly to an improved structure of the aquarium filter that combines the planting units and an aquarium filter, which has a multi-layer filtering effect and is at low production cost.

2. Description of Related Art

Aquarium filters of the prior art generally guide the water through a pipe to the filter box installed on the aquarium. The filter net is installed inside the filter box so that water guided to the filter box is filtered by the filter net. The filter net generally is made of resin cotton. Water that has been filtered by the filter net flows to the aquarium through the drainage hole below the filter box.

However, the aquarium filters of the prior art have the following deficiencies:

1. Poor filtering effect: Aquarium filters of the prior art all adopt a top-down filter processing wherein the filter net thereof is made of a single layer of resin foam or polyester fiber. In order to prevent pores of the filter from being blocked so that water with impurities may pill upward over the filter net causing the impurities to return to the aquarium, some vendors will design the pores of the filter in a larger form. However, such filter net is hard to block small particles during filtration resulting in that not all impurities can be filtered. Eventually, impurities still return to the aquarium during the incomplete filtration process and the quality of the aquarium becomes worse.

2. Using a filter net with smaller pores, the filter net is blocked easily and quickly: When replacing the aquarium with a filter net of the prior art that can filter out impurities of smaller size, nonwoven fabric with smaller pores is generally chosen for the filter net instead. However, since all filter nets of the prior art use single layer filtering and a top-down single-direction filtering process, as a result, the filter net will accumulate impurities of large or small sizes more quickly. As the filter net has too many impurities accumulated on it, water is detained in the filter box and can no longer continue flowing downward. In the worse case, water overflows the filter box and still returns. Since there is not any filtration setting over the filter box, therefore, the unfiltered water returns to the aquarium and makes the water in the aquarium to be more turbid or, in some cases, causes the fish to die.

3. High economic cost: The aquarium filter of the prior art can only provide single layer filtering and a top-down single-direction filtration. Not only small fine impurities can not be completely filtered, the filter net is soon covered with accumulated impurities, resulting in poor water filtering effect. As a result, the aquarium and the filtering equipment need to be washed and cleaned frequently or to change the water inside the aquarium and the filter net inside the filter box. The process is time consuming and demands effort, resulting in high economic cost.

4. Difficult to clean: When cleaning the aquarium filter of the prior art, fish in the aquarium must be removed first; then the aquarium is washed and cleaned, followed by cleaning the filter box. By doing in such sequence, one can avoid the impurities in the filter box from flushing back to the aquarium. Some vendors add a plurality of small drainage holes in the filter box or use multiple filter boxes making the cleaning of the filter boxes difficult and laborious.

Therefore, the present inventor has disclosed an aquarium filter with multi-layer filtration in the previous patent thereof and the filter cloth can be any shape of pouch form, so that the problem of poor filtering effect of the prior art is resolved by multi-layer filtration. The aforementioned filter can filter different size of impurities through different layer so that the service time for accumulating impurities is prolonged and therefore the service lifetime of the filter can be further extended. Water that enters the filter can outflow to multiple directions through the pouch-bag shape design instead of one restricted direction from top to down. Even when the filter is packed with impurities inside, causing water to overflow from the filter, the design ensures water that outflows from the top or other directions has been filtered through multi-layer filtration. Therefore, the number of times to replace the filter or the aquarium can be reduced; an excellent filtering effect can be achieved; the service lifetime of the filter can be prolonged.

In order to achieve the effect of deodorization, the aforementioned conventional art is especially installed with activated carbon filter sheet, wherein the production process of the activated carbon filter sheet is provided with excellent deodorization effect.

Although the filter described in the conventional art can solve many deficiencies of the conventional aquarium filter, in order to achieve the deodorization effect, the activated carbon filter plate of the aforementioned conventional art is used. However, after a period of utilization, it is uncovered that, even though the deodorization effect works very well, the production process of the activated carbon filter plate of the conventional art is very complicated. As a result the production cost is pretty high and the overall production cost increases accordingly.

In view of this, the present inventor investigated the aforementioned deficiencies of the conventional art, identified the improvements and solutions based on years of relevant knowledge and experience of research and development in order to achieve the effect of reducing the production cost and prolonging the service lifetime. Furthermore, the invention also combines the planting unit so that, while cultivating aquatic living organisms, the invention can grow plants that can further purify the indoor air. The filtered water can provide nutrients needed by plants for growth. Thus, a state of symbiosis of fish and plants is formed.

SUMMARY OF THE INVENTION

The objective of the invention is to provide an improved structure of the aquarium filter, wherein the characteristic thereof is to reduce the production cost of the filter through a design of multi-layer filtration that is formed individually by one single process, and to combine the planting units to form the improved structure of the aquarium filter.

The objective and effectiveness of the improved structure of the aquarium filter of the invention is achieved by the following technologies. The aforementioned aquarium filter comprises a filter cloth made of nonwoven fabric in pouch-bag shape with small pores and high density, at least one layer of activated carbon filter sheet that wraps within the filter cloth and can deodorize smell and filter toxic, and at least one layer of filter net that wraps within the activated carbon filter sheet, wherein the aforementioned filter cloth can be in any shape; the filter net is made of resin foam with large pores and low density, compared with those of the filter cloth, wherein the innermost layer of the aquarium filter has a hollow filter space and a water inlet that is connected to one side of the filter space and the aquarium filter; the aforementioned water inlet can be fixedly connected with a water guiding pipe; one end of the water guiding pipe is immersed in the water of the aquarium and the other end thereof is connected to the water inlet and therefore has the connectivity to the filter space, so that water in the aquarium is led to the filter space through the water guiding pipe;

wherein the aforementioned activated carbon filter sheet can be obtained without using a complex production process and is a commonly used activated carbon filter sheet instead; the activated carbon filter sheet is in connection with the filter cloth by the method of sewing so that the overall structure of the aquarium filter is formed individually by one single process and the cost thus is reduced, resulting in the reduction of the production cost;

wherein, according to the composition of the aforementioned structure, after water is led to the filter space by the water guiding pipe through the water inlet, the water passes through at least one layer of filter net that filters median and large sizes of impurities (for example, excreta or unfinished fish food), and at least one layer of activated carbon filter sheet that performs the deodorization function and further filtration of impurities, and finally, owing to its features of small pores and high density, the filter cloth filters smaller and fine sizes of impurities in the water; thus a state of multi-layer filtering from inside to outside is formed. Therefore, most toxic and impurities in the water filtered by the aquarium filter have been removed and the water is very clear.

Furthermore, during the operation of the aquarium filter, water that reaches the outermost layer of filter cloth has been through multiple layers of filtration. Therefore, the service lifetime of the filter cloth is prolonged. Even if the filter space is packed with impurities, water inside the filter space will not directly overflow the space from the upper area of the filter cloth or any other directions without passing through multiple layers of filtration due to the multi-layer pouch-shape design of the invention. This will ensure that water overflowing and returning to the aquarium is clean. Therefore, the time interval between cleaning the aquarium can be extended longer while the water remains clean. Owing to the nature of the pouch-shape design, when the parts of the invention are dissembled, there is no need of a series of complicated operation steps to remove the fish first before cleaning the aquarium. Simply dissemble the connection part between the aquarium and the water guiding pipe. Therefore, replacement of the aquarium filter is much more convenient.

Furthermore, another form of improved structure of the aquarium filter further includes an aquarium, a support frame that is installed above the aquarium, planting units that sit on the support platforms of the support frame and are used for cultivating plants, and a filter that is installed on the uppermost layer of the support platform of the support frame, wherein the filter can be the aquarium filter described in the previous paragraph, wherein the aforementioned support frame includes the frame bodies that are connected with the aquarium and at least one layer of support platform that is fixedly connected to the frame bodies; a water guiding hole is installed underneath the aforementioned support platform to guide and drain the water on the support platform downward; the lower part of the aforementioned planting unit is configured with drainage pores to accelerate water that flows inside the planting unit toward the water guiding hole;

wherein the filter box is installed on the support platform to provide a space for the filter to be installed, wherein a drainage hole is installed beneath the filter box, so that the filter has a space to be set on and will not disconnect from the water guiding pipe easily.

Furthermore, water filtered by the filter through multiple layers is discharged from the drainage hole of the filter box and flows toward the drainage pores of the support platform. Water is led downward through the drainage pores to the planting unit below the support platform so that plants in the planting unit will receive the filtered water source and can absorb nutrients generated from the decomposition of fish excreta in the water that is needed for the growth of plants. Water whose nutrients have been absorbed by plants flows from the drainage pores of the planting unit toward the water guiding hole of the support platform and then continuously flows through the water guiding hole to the next layer of planting unit. When water travels through multiple layers of planting units and reaches the planting unit on the lowermost support platform, the water will flow through the drainage pores of the lowermost planting unit and return to the aquarium through the water guiding hole of the lowermost support platform. While water passing through plants, plants will also release partial energy back to water. Water returns to the aquarium not only is very clear but also contains energy released by the plants, so that aquatic living organisms live in a water of better quality that increases their momentum and health. Therefore, the invention optimizes the use of space, cultivates aquatic living organisms and many plants at the same time, and therefore a state of symbiosis of fish and plants is formed.

Besides, plants also release phytoncid that improves the air quality of the space where the aquarium filter is installed. The growers can enjoy the moral cultivation and joyful living while tending the aquatic living organisms at the same time.

The above and other objects, features and advantages of the invention will become apparent from the following detailed description taken with the accompanying drawings.

DETAILED DESCRIPTION OF THE INVENTION

Figure 1:
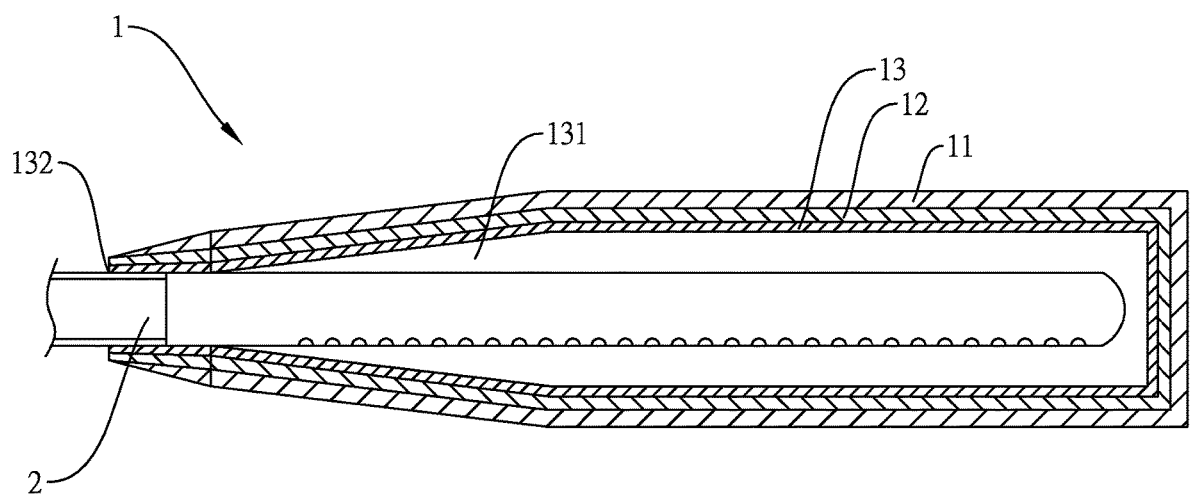
FIG. 1 is a schematic diagram of the cross section of the first preferred embodiment of the invention.
Figure 2:
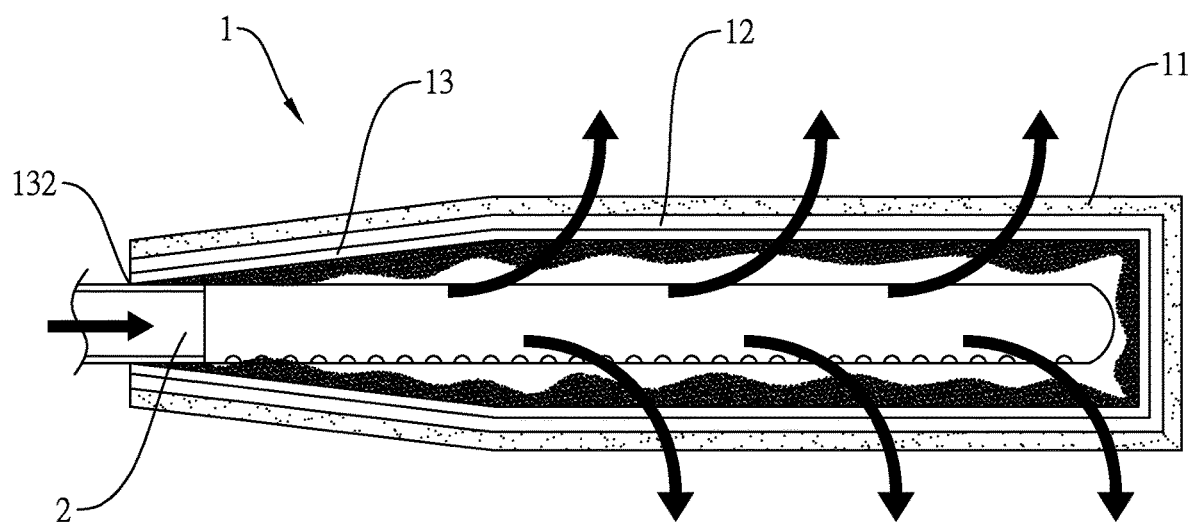
FIG. 2 is a schematic diagram of the operation of the first preferred embodiment of the invention.
Figure 3:
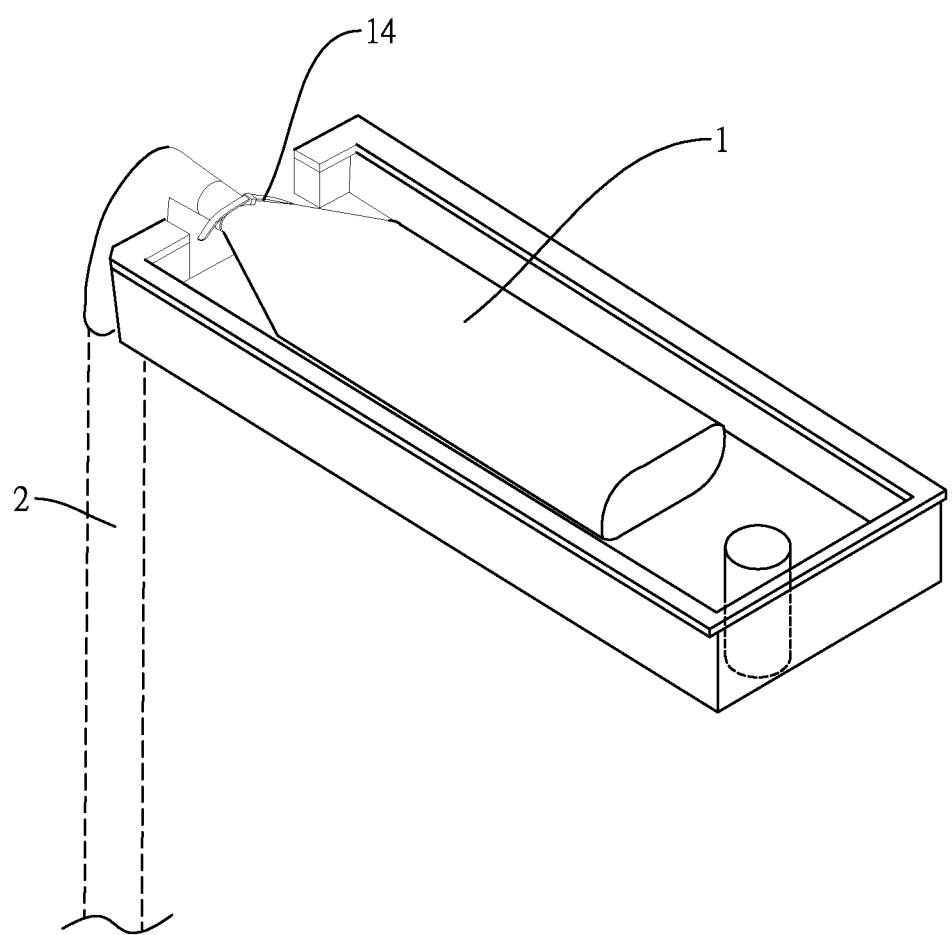
FIG. 3 is a perspective schematic diagram of the first preferred embodiment of the invention.

First, please refer to FIG. 1-FIG. 3. FIG. 1 is the schematic diagram of the cross section of the first preferred embodiment of the invention; FIG. 2 is the schematic diagram of the operation of the first preferred embodiment of the invention; FIG. 3 is the perspective schematic diagram of the first preferred embodiment of the invention.

The improved structure of the aquarium filter 1 of the first preferred embodiment of the invention comprises a filter cloth 11 that is installed on the outermost layer of the aquarium filter 1, an activated carbon filter sheet 12 that wraps within the filter cloth 11, and a filter net 13 that wraps within the activated carbon filter sheet 12, wherein the filter cloth 11 is made of nonwoven fabric with small pores and high density to filter small or fine sizes of impurities (for example, excreta or unfinished fish food), and the filter cloth 11 can be any shape of pouch form;

wherein the activated carbon filter sheet 12 is made of activated carbon material and can deodorize smell and further filter impurities; in additional to deodorize the smell generated as a result of bacterial decomposition, the activated carbon filter sheer 12 also can perform an additional filtration of impurities;

wherein the filter net 13 has at least one layer and can be made of resin foam; the filter net 13 has larger pores and lower density, compared with those of filter cloth, to filter larger sizes of impurities;

wherein the inner layer of the filter net 13 has a hollow filter space 131 and a water inlet 132 that is connected to one side of the filter space 131 and the filter 1; the aforementioned water inlet 132 can be fixedly connected with a water guiding pipe 2; one end of the water guiding pipe 2 is immersed in the water of the aquarium and the other end thereof is connected to the water inlet 132, so that water in the aquarium can be led to the water inlet 132 through the water guiding pipe 2 and then enter the filter space 131 to be filtered.

On the other hand, when the filter space 131 is packed with impurities, water inside the filter space 131 will not directly overflow the space from the upper area. Instead, using the multi-layer pouch-shape design of the aquarium filter 1, water that overflows the space from the upper area of the filter cloth 11 or any other directions has already passed through multiple layers of filtration. This will ensure that water overflowing and returning to the aquarium is clean. Therefore, the time interval between cleaning the aquarium can be extended longer while the water remains clean;

wherein, owing to the nature of the pouch-shape design, when the parts of the invention are dissembled, there is no need of a series of complicated operation steps to remove the fish first before cleaning the aquarium; simply dissemble the connection part between the aquarium filter 1 and the water guiding pipe 2; thus replacement of the aquarium filter 1 is much more convenient;

wherein the aforementioned activated carbon filter sheet 12 can be obtained without using a complex production process and is a commonly used filter sheet made of activated carbon material, so that the production cost can be reduced; the activated carbon filter sheet 12 is in connection with the filter cloth 11 by the method of sewing or the filter cloth 11, the activated carbon filter sheet 12, and the filter net 13 can be formed by one single process using the method of sewing, so that the cost is reduced, resulting in the reduction of the production cost;

wherein, in reference to FIG. 1 and FIG. 3, an elastic tight band 14 is installed around the outer part of the water inlet 132 to make the water inlet 132 to be fixedly connected with the water guiding pipe 2 more easily in order to firmly install and to tightly seal the connection between the aquarium filter 1 and the water guiding pipe 2; at the same time, the aquarium filter 1 has a disposable design; based on the human judgment on the blocking condition of the outermost layer of the filter cloth 11 (nonwoven fabric) to perform the cleaning; when the parts of the invention are dissembled, there is no need of a series of complicated operation steps to remove the fish first before cleaning the aquarium. Simply untie the tight band 14 and dissemble the connection part between the aquarium filter 1 and the water guiding pipe 2 easily; therefore, replacement of the aquarium filter 1 is much more convenient.

The aforementioned filter cloth 11, the activated carbon filter sheet 12, and the filter net 13 can be increased to two layers or more respectively. The filter cloth 11, the activated carbon filter sheet 12, and the filter net 13 of the present embodiment are illustrated using single layer respectively as an example. According to the composition of the aforementioned structure, water in the aquarium is guided by the water guiding pipe 2 to the water inlet 132 of the aquarium filter 1.

After water is led through the water inlet 132, the filter net 13 (resin foam) with large pores and low density filters large sizes of impurities (for example, fish food or excreta, or large-size impurities). Next, water filtered by the filter net 13 enters the layer of activated carbon filter sheet 12 that performs the deodorization function and further filtration of impurities. Finally, owing to its features of small pores and high density, the filter cloth 11 filters smaller and fine sizes of impurities in the water as shown with the arrows as the directions of water flow. Thus most toxic in the water has been removed and the water becomes very clear. Using the method of multi-layer of filtration can prolong the usage duration as larger size of impurities accumulated and eventually blocked the outermost layer of filter cloth 11, and further prolong the service lifetime of the aquarium filter 1.

Figure 4:
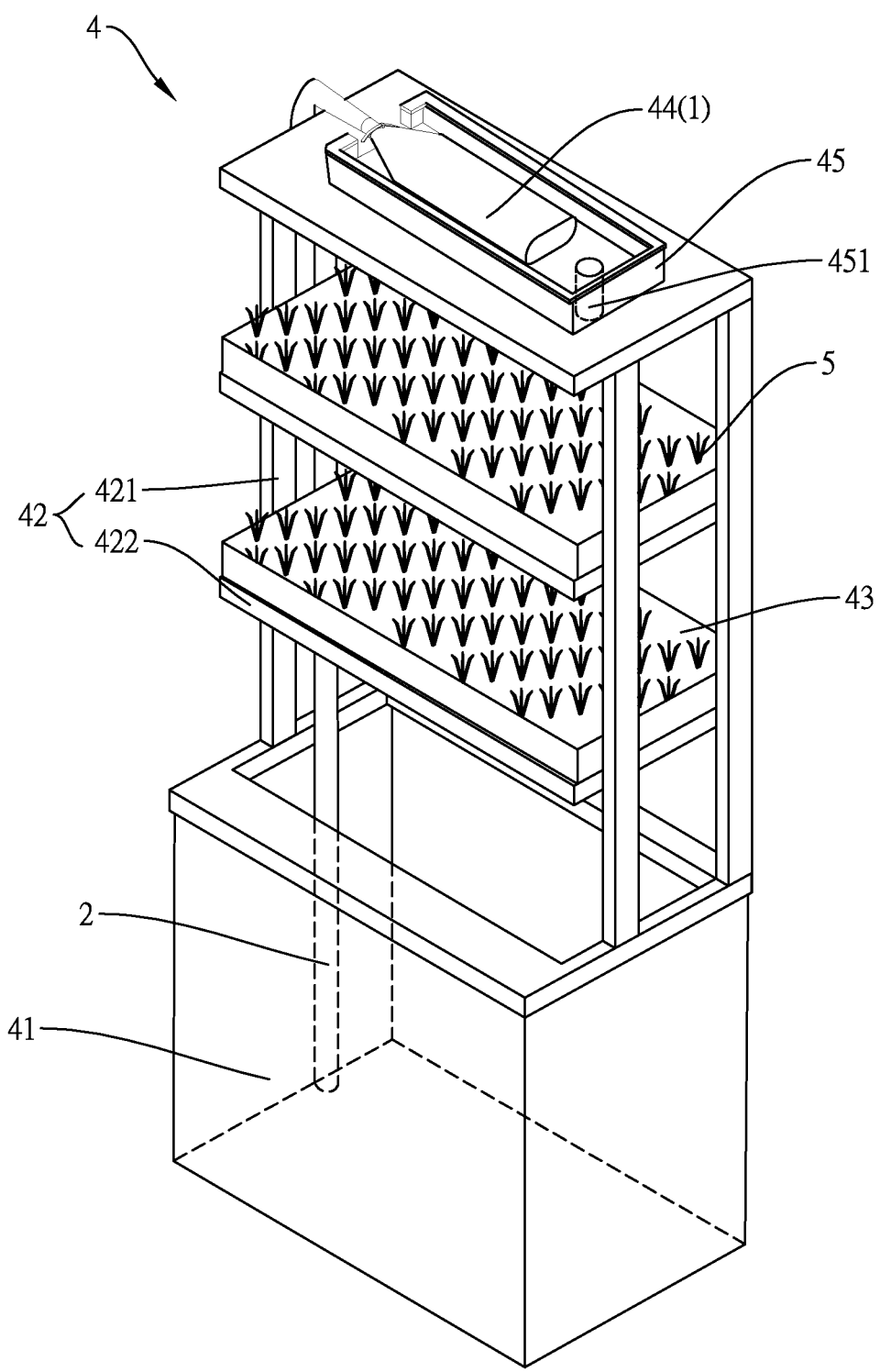
FIG. 4 is a perspective schematic diagram of the second preferred embodiment of the invention.
Figure 5:
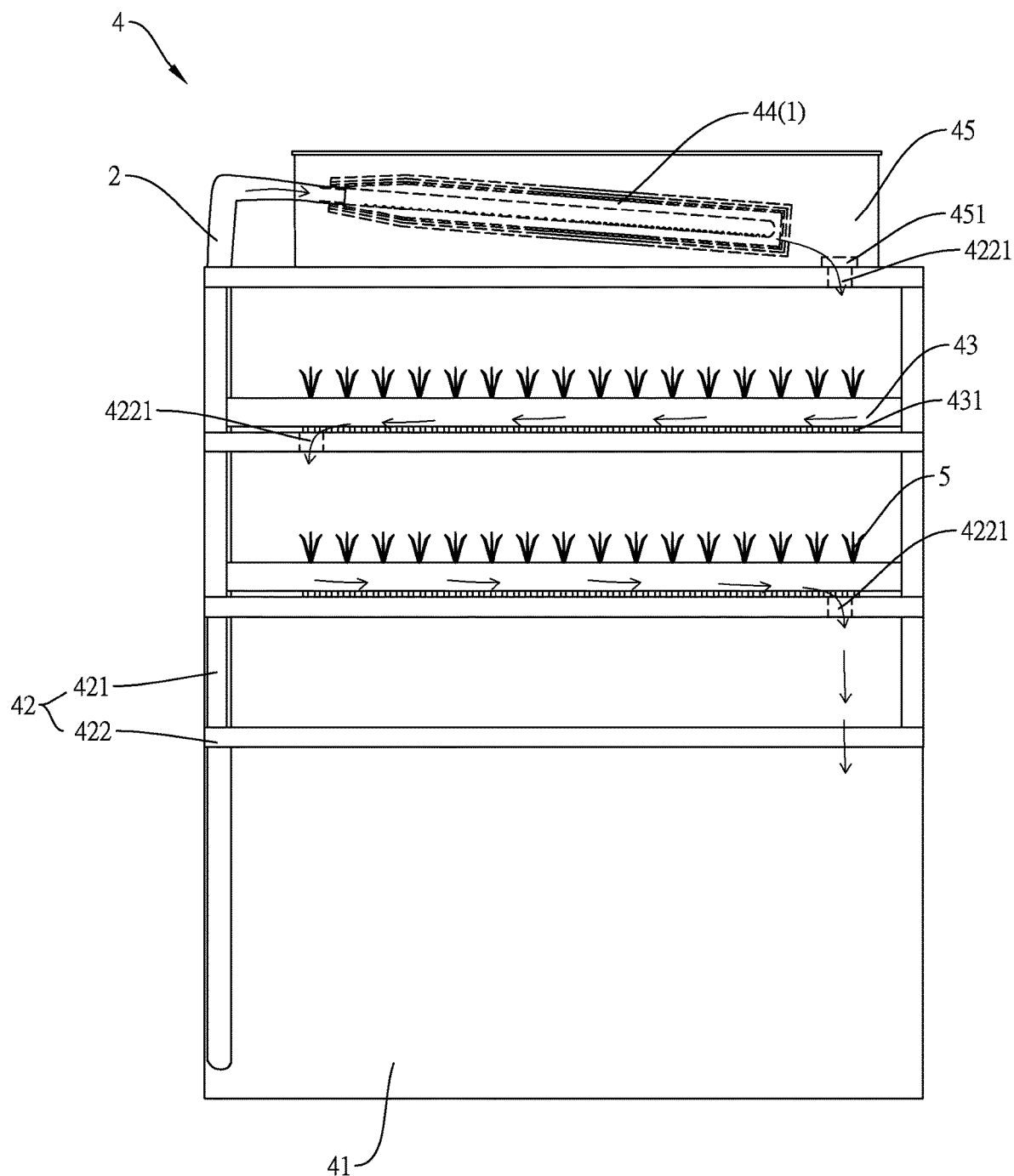
FIG. 5 is a schematic diagram of the operation of the second preferred embodiment of the invention.

Please refer to FIG. 4-FIG. 5. FIG. 4 is the perspective schematic diagram of the second preferred embodiment of the invention; FIG. 5 is the schematic diagram of the operation of the second preferred embodiment of the invention.

The improved structure of the aquarium filter 4 of the second preferred embodiment of the invention comprises an aquarium 41, a support frame 42, planting units 43, and a filter 44, wherein the aquarium 41 is a case to cultivate aquatic living organisms; the support frame 42, which is installed above the aquarium 41, comprises a frame body 421 connected to the aquarium 41 and at least one layer of support platform 422 that is fixedly connected with the frame body 421; a water guiding hole 4221 is installed underneath the aforementioned support platform 422 in order to guide the water on the support platform 422 downward to be discharged; the water guiding hole 4221 of the lowermost support platform 422 will guide water downward to return to the aquarium 41; in addition, the aforementioned support platform 422 and the frame body 421 can be connected to each other using a form of drawer-type setting; the planting units 43, which sit on the support platforms 422 and can be a tray form and are used for cultivating plants 5; the lower part of the aforementioned planting units are configured with drainage pores 431 (as shown in FIG. 5) to accelerate water that flows inside the planting unit 43 toward the water guiding hole 4221 of the support platform 422; the plants 5 release phytoncid that will improve the air quality of the space where the filter is installed; the growers can enjoy the moral cultivation and joyful living while tending the aquatic living organisms at the same time; the filter 44 is the aquarium filter 1 of the first preferred embodiment and is installed on the uppermost support platform 122; please refer to FIG. 1; the filter 44 also comprises a filter cloth 11 that is installed on the outermost layer of the filter 44, an activated carbon filter sheet 12 that wraps within the filter cloth 11, and a filter net 13 that wraps within the activated carbon filter sheet 12, wherein the inner layer of the filter net 13 has a hollow filter space 131 and a water inlet 132 that is connected to one side of the filter space 131 and the filter 44; the aforementioned water inlet 132 can be fixedly connected with a water guiding pipe 2; one end of the water guiding pipe 2 is immersed in the water of the aquarium 41 and the other end thereof is connected to the water inlet 132, so that water in the aquarium 41 can be led to the water inlet 132 through the water guiding pipe 2 and then enter the filter space 131 to be filtered; the filtration operation and effect of water flowing into the filter 44 from the water guiding pipe 2 is the same as that of the first preferred embodiment and will not be repeated again, wherein the filter box 45 is installed on the support platform 422 to provide a space for the filter 44 to be installed, and a drainage hole 451 is installed beneath the filter box 45, so that the filter 44 has a space to be set on and will not disconnect from the water guiding pipe 2 easily.

The aforementioned support platform 422 can be at least one layer and the support platforms 422 of this embodiment are illustrated using two layers as an example. The operation of the invention is described as follows. The filtration operation and effect of water flowing into the filter 44 from the water guiding pipe 2 is the same as that of the first preferred embodiment and will not be repeated again. After water passes through the multi-layer filtration of the filter 44, as shown in FIG. 5 with the arrows as the directions of water flow, the water will be discharged from the drainage hole 451 of the filter box 45 and heads to the direction of the water guiding hole 4221 of the support platform 422. Water is led downward to flow to the planting unit 43 below through the water guiding hold 4221 so that the planting unit 43 will receive the filtered water source and the plants 5 inside the planting units 43 can absorb nutrients generated from the decomposition of fish excreta in the water that is needed for the growth of plants 5. Water whose nutrients have been absorbed by plants flows from the planting unit 43 toward the water guiding hole 4221 of the support platform 422 and then continuously flows through the water guiding hole 4221 to the next layer of planting unit 43. When water travels through multiple layers of planting units 43 and reaches the planting unit 43 on the lowermost support platform 422, the water will flow through the water guiding hole 4221 of the lowermost support platform 42 and return to the aquarium 41. While water passing through plants, plants 5 will also release partial energy back to water. Water returns to the aquarium 41 not only is very clear but also contains energy released by the plants 5, so that aquatic living organisms live in a water of better quality and gain energy that increases their momentum and health, and prolongs their lifetime. Therefore, the invention optimizes the use of space, cultivates aquatic living organisms and many plants 5 at the same time, and therefore a state of symbiosis of fish and plants is formed.

In summary, the improved structure of the aquarium filter of the invention has the technology that other products of same technology categories of the prior art can not provide. In other words, the invention has the following advantages:

1. Multi-layer filtration making water much clearer: through the use of the filter cloth, the activated carbon filter sheet, and the filter net, impurities of different volume sizes can be filtered accordingly. The invention also has the deodorization effect. Therefore, the filtered water has better quality and the filtration effect is better.

2. Longer service lifetime of the aquarium filter: Through the multi-layer design, impurities can be accumulated by size and by layer to avoid larger impurities to stockpile on the outermost layer of filter cloth made of nonwoven fabric. Therefore, the service time can be extended longer; the frequency of replacing the aquarium filter and cleaning the aquarium is reduced.

3. Reduction of the production cost: the filter cloth, the filter net and the activated carbon filter sheet can be sewed individually by one single process to simplify the design of the multi-layer pouch-bag shape filter. There is no complicated production process of the activated carbon filter sheets and therefore the production cost can be reduced.

4. Easy to dissemble: The invention has a disposable pouch-bag shape design. When the aquarium filter reaches the end of its service life time, untie the tight band and easily to dissemble the parts. There is no need of a series of complicated operation steps to remove the fish first before cleaning the aquarium. Therefore, replacement of the aquarium filter is much easier.

5. Enjoying the moral cultivation and joyful living: The growers can enjoy the moral cultivation and joyful living while tending the aquatic living organisms and planning plants at the same time.

6. Symbiosis of fish and plants: Plant plants while cultivating aquatic living organisms and both tasks can share the same resources and be beneficial to each other. A goal of win-win situation for growing both species can be achieved.

7. Air quality of the cultivation space improved: While tending plants, the plants will release phytoncid that purifies the air quality of the space.

8. Aquatic living organisms with better momentum: Through the multi-layer filtration process, water returns to the aquarium not only is very clear but also contains energy released by the plants. Therefore, when filtered water returns to the aquarium, the water can provide better living environment to aquatic living organisms live in the water. Therefore, the aquatic living organisms will be healthier and active.

While the invention has been described in terms of preferred embodiments, those skilled in the art will recognize that the invention can be practiced with modifications within the spirit and scope of the appended claims.

What is claimed is:

1. An aquarium filter device for providing filtered water to an aquarium, the aquarium filter device comprising an outer filter cloth, an inner filter net, an activated carbon filter sheet disposed between the outer filter cloth and the inner filter net, a space defined by the inner filter net, and a water inlet connected to a single opening of the space wherein
the outer filter cloth includes at least one layer of nonwoven fabric having a plurality of first pores and a first density;
the activated carbon filter sheet including at least one layer of activated carbon material;
the filter net includes at least one layer of resin foam having a plurality of second pores greater than the first pores, and a second density less than the first density; and
a water guiding pipe having a first end immersed in the aquarium and a second end connected to the water inlet;
wherein water in the aquarium is configured to flow though the water guiding pipe and the water inlet into the space and further flow through the inner filter net, the activated carbon filter sheet, and the outer filter cloth.

* * * * *